US005625835A

United States Patent [19]
Ebcioglu et al.

[11] Patent Number: 5,625,835
[45] Date of Patent: Apr. 29, 1997

[54] METHOD AND APPARATUS FOR REORDERING MEMORY OPERATIONS IN A SUPERSCALAR OR VERY LONG INSTRUCTION WORD PROCESSOR

[75] Inventors: Mahmut K. Ebcioglu, Somers, N.Y.; David A. Luick, Rochester, Minn.; Jaime H. Moreno, Hartsdale; Gabriel M. Silberman, Millwood, both of N.Y.; Philip B. Winterfield, Rochester, Minn.

[73] Assignee: International Business Machines Corporation, Armonk, N.Y.

[21] Appl. No.: 435,411

[22] Filed: May 10, 1995

[51] Int. Cl.$^6$ .................................................. G06F 9/38
[52] U.S. Cl. .................... 395/800; 395/591; 364/DIG. 1; 364/263.2; 364/263; 364/262.4
[58] Field of Search ................................ 395/800, 325

[56] References Cited

U.S. PATENT DOCUMENTS

| | | | |
|---|---|---|---|
| 4,903,264 | 2/1990 | Talgam | 371/16.1 |
| 5,450,560 | 9/1995 | Bridges et al. | 395/410 |
| 5,463,745 | 10/1995 | Vidwans et al. | 395/375 |
| 5,526,499 | 6/1996 | Bernstein et al. | 395/375 |
| 5,537,559 | 7/1996 | Kane et al. | 395/375 |
| 5,542,075 | 7/1996 | Ebcioglu et al. | 395/700 |
| 5,546,599 | 8/1996 | Song | 395/800 |
| 5,548,738 | 8/1996 | Song | 395/375 |
| 5,557,763 | 9/1996 | Senter et al. | 395/375 |
| 5,559,976 | 9/1996 | Song | 395/375 |

OTHER PUBLICATIONS

K. Diefendorff and M. Allen, "Organization of the Motorola 88110 superscalar RISC microprocessor," *IEEE Micro*, pp. 40–63, Apr. 1992.

K. Ebcioglu et al., "VLIW Compilation techniques in a superscalar environment," in *Proc. of the Parallel Architectures and Compiler Technuques PACT '94*, 1994.

A. Huang et al., "Speculative disambiguation: a compilation technique for dynamic memory disambiguation," in *21st Intl. Symposium on Computer Architecture*, (Chicago, IL) pp. 200–210, 1994.

A. Nicolau, "Run–time disambiguation: coping with statically unpredictable dependencies," *IEEE Transactions on Computers*, vol. 38, May 1989.

K. Ebcioglu, "Some design ideas for a VLIW architecture for sequential natured software," *Parallel Processing (Proceedings of IFIP WG 10.3, Working Conference on Parallel Processing)*, pp. 3–21, 1988.

*Primary Examiner*—Larry D. Donaghue
*Attorney, Agent, or Firm*—Whitham, Curtis, Whitham & McGinn; Robert P. Tassinari, Jr.

[57] ABSTRACT

A method and apparatus for reordering memory operations in superscalar or very long instruction word (VLIW) processors is described, incorporating a mechanism that allows for arbitrary distance between reading from memory and using data loaded out-of-order, and that allows for moving load operations earlier in the execution stream. This mechanism tolerates ambiguous memory references. The mechanism executes only one additional instruction for disambiguation purposes, thus producing good performance, and integrates memory disambiguation with speculative execution of instructions. The overhead introduced is only one instruction, and the load operation can be arbitrarily moved earlier in the instruction stream. The mechanism can cope with conflicts that occur as a result of an unexpected combination of store/load instructions, can be used in a coherent multiprocessor context, and combines speculative execution with reordering of memory operations in a way which requires simple hardware support.

3 Claims, 3 Drawing Sheets

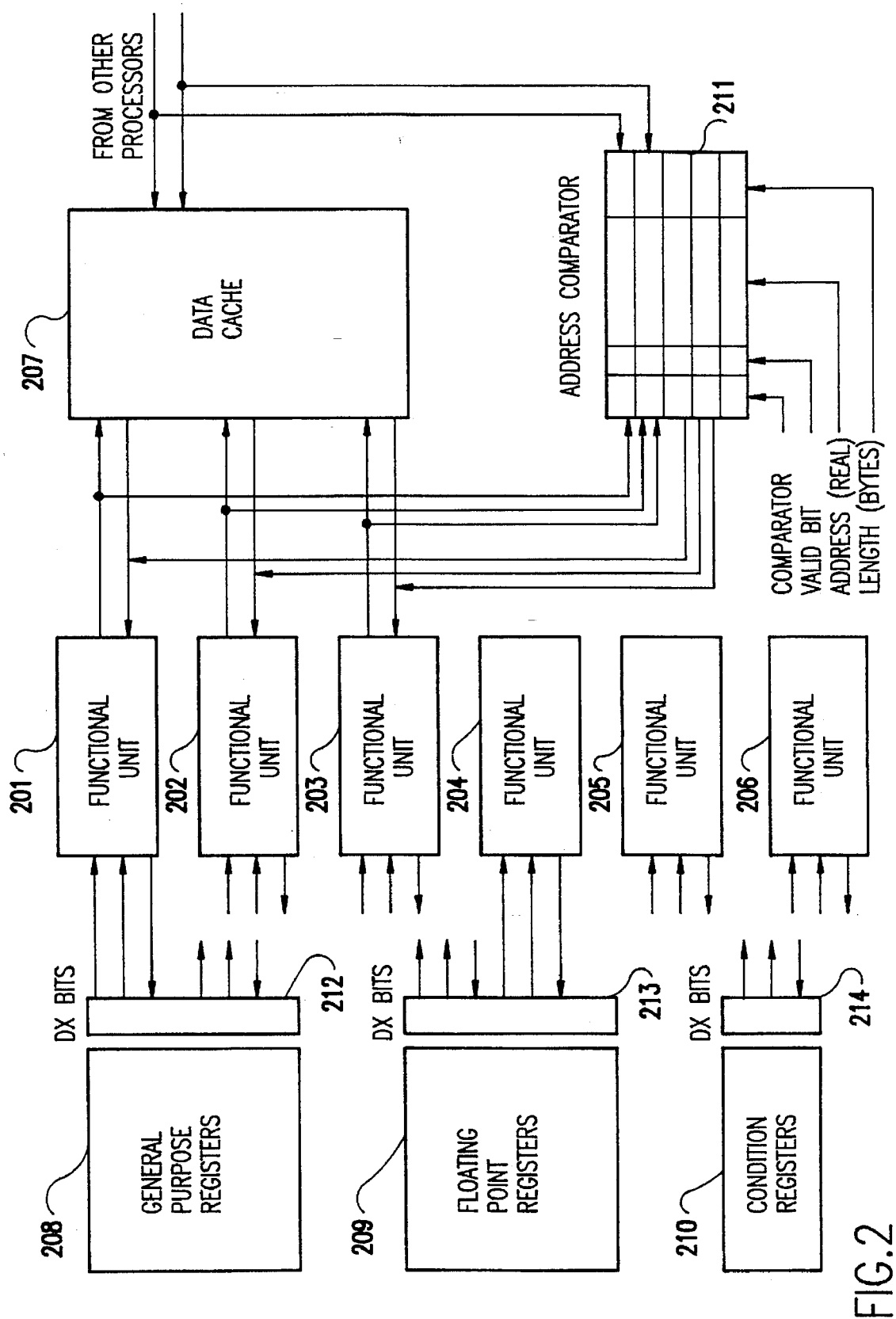

METHOD AND APPARATUS FOR REORDERING MEMORY OPERATIONS IN A SUPERSCALAR OR VERY LONG INSTRUCTION WORD PROCESSOR

BACKGROUND OF THE INVENTION

1. Field of the Invention

The present invention generally relates to reordering memory operations in a superscalar or very long instruction word (VLIW) processor in order to exploit instruction-level parallelism in programs and, more particularly, to a method and apparatus for reordering memory operations in spite of arbitrarily separated or ambiguous memory references, thereby achieving a significant improvement in the performance of the computer system. The method and apparatus are applicable to uniprocessor and multiprocessor systems.

2. Background Description

High performance contemporary processors rely on superscalar and/or very long instruction word (VLIW) techniques for exploiting instruction level parallelism in programs; that is, for executing more than one instruction at a time. These processors contain multiple functional units, execute a sequential stream of instructions, are able to fetch two or more instructions per cycle from memory, and are able to dispatch two or more instructions per cycle subject to dependencies and availability of resources. These capabilities are exploited by compilers which generate code that is optimized for superscalar and/or VLIW features.

In sequential programs, a memory load operation reads a datum from memory, loads it in a processor register, and frequently starts a sequence of operations that depend on the datum loaded. In a superscalar or VLIW processor in which there are resources available, it is advantageous to initiate memory load operations as early as possible because that may lead to the use of otherwise idle resources and may hide delays in accessing memory (including potential cache misses), thus reducing the execution time of programs. The load, as well as the operations that depend on the load, are executed earlier than what they would have been in a strictly sequential program, achieving a shorter execution time. This requires the ability to perform non-blocking loads (i.e., continue issuing instructions beyond a load which produces a cache miss), the ability to issue loads ahead of preceding stores (i.e., out-of-order loads), the ability to move loads ahead of preceding branches (i.e., speculation), and the ability to move operations that depend on a load ahead of other operations. In other words, what is needed is the ability to reorder the operations of the program.

Several factors limit the ability to perform reordering of memory operations, in particular factors arising from runtime dependencies in the execution of a program. These include moving operations ahead of conditional branch instructions and ambiguous memory references.

Moving an operation ahead of a preceding conditional branch instruction introduces speculation in the execution of a program, because the operation is executed before it is known whether it will be really required. The code motion is performed under the expectation that the operation will be needed. Register-to-register operations with no side-effects can be executed speculatively, as long as the results are saved in unused ("dead") registers. If an operation was not required, the result is just ignored. On the other hand, register-to-register operations with side-effects and memory load operations can be executed speculatively only if there exist mechanisms to recover from side effects which should not have been produced, such as exceptions (errors), protection violations, or accesses to volatile memory locations.

Moving a memory load operation ahead of a preceding memory store operation faces the problem of ambiguous references in the execution of the program if it is not possible to determine at compile time that the memory locations accessed by the load and store are different. Unambiguous memory references can be executed out-of-order because they do not conflict. On the other hand, ambiguous memory operations can be executed out-of-order only if there exist mechanisms to detect a potential conflict, ignore the data loaded ahead of time, and reload the correct value after the store operation has been performed. The conflict may be in a single byte of a multiple byte operand, so the store operation must be completed before the load operation can be performed.

Although the two problems described above are different, their effects and requirements are the same. Namely, there must exist mechanisms to detect and recover from the side effects or ambiguities. In the following discussion, both of these problems are referred to as "reordered memory accesses problems".

Contemporary compilation techniques include static memory disambiguation algorithms for reordering memory operations. These algorithms determine if two memory references, a memory store operation followed by a memory load operation, access the same location. If the references do not conflict (i.e., they address different memory locations), then it is possible to reorder the operations so that the load can be executed ahead of the store. Static disambiguation works well only if the memory access pattern is predictable. Frequently, that is not the case, and the compiler/programmer must make the conservative assumption that their references actually conflict so they must be executed sequentially (in their original order), which reduces the potential instruction-level parallelism in the program.

Reordering of memory operations has been a subject of active interest. See, for example, the article by K. Diefendorff and M. Allen entitled "Organization of the Motorola 88110 superscalar RISC microprocessor", IEEE Micro., April 1992, pp. 40–63. The dynamic scheduler in the Motorola 88110 processor dispatches store instructions to a store queue where the store operations might stall if the operand to be stored has not yet been produced by another operation. Subsequent load instructions can bypass the store and immediately access the memory, achieving dynamic reordering of memory accesses. An address comparator detects address hazards and prevents loads from going ahead of stores to the same address. The queue holds three outstanding store operations, so that this structure allows runtime overlapping of tight loops. The structure does not really move a load earlier in the sequential execution stream; instead, it only allows for a load operation not to be delayed as a result of a stalled store operation.

The static motion of load/store operations out from loops, under certain conditions, was described by K. Ebcioglu, R. Groves, K. Kim, G. Silberman, and I. Ziv in "VLIW compilation techniques in a superscalar environment" SIGPLAN Conference on Programming Language Design and Implementation (PLDI '94), 1994. This approach is basically a generalization of the static movement of loop-invariant instructions out of loops, with the additional capability of moving loads and stores which are executed conditionally if they are considered safe. The conditions required for this optimization include guaranteeing that there is no possibility for conflicting memory references (ambiguous memory references), which is not always possible.

A compilation technique which allows scheduling of speculative loads without modifying the architecture of the processor is described by D. Bernstein, M. Rodeh and M. Hopkins in their patent application entitled "Instruction scheduler for a computer" Ser. No. 08/364,833 filed Dec. 27, 1994, as a continuation of application Ser. No. 07/882,739 filed May 14, 1992, and assigned to the assignee of this application now U.S. Pat. No. 5,526,499. In this approach, the suitabililily of a load operation for speculative execution is determined by classifying it into a number of categories depending on conditions applied to the base register used by the operation and/or the contents of such a base register. Thus, as in the techniques described by K. Ebcioglu et al., supra, this approach is restricted to those cases that can be detected at compile time.

A hybrid memory disambiguation technique called "speculative disambiguation" was proposed by A. Huang, G. Slavenburg, and J. Shen in "Speculative disambiguation: a compilation technique for dynamic memory disambiguation", 21st Intl. Symposium on Computer Architecture, Chicago, pp. 200–210, 1994. This approach uses a combination of hardware and compiler techniques to achieve its objective. It performs transformations on the code to anticipate either outcome of an ambiguous memory reference, requiring guarded execution capabilities in the hardware. For each pair of ambiguous memory references, the compiler creates two versions of the code that depends on the memory reference. One version assumes that the addresses overlap, whereas "the other version assumes they do not overlap. In both versions, operations that do not have side effects are executed, while operations that have side effects are guarded by the result of comparing the two addresses. This approach requires more operations and resources than the original program, in addition to capabilities for guarded execution, deals only with disambiguation, but does not have capabilities for moving load operations ahead of branches.

Another alternative to perform compiler optimization of program execution by allowing load operations to be executed ahead of store operations is described by A. Nicolau in "Run-time disambiguation: coping with statically unpredictable dependencies", IEEE Trans. On Computers, vol. 38, May 1989. This approach relies on compiler identification of a load, which can be moved ahead of a store operation, and compiler insertion of the necessary code, so that the processor can check at run-time if there is a match among the address of the load and store operations, as described by A. Huang et al., supra, but without guarded-execution capabilities. If there is no match, the processor executes a sequence of instructions in which the load has been moved ahead of the store. On the other hand, if there is a match, the processor executes a sequence of instructions in which the load operation is performed after the store operation. Since the check for the address match is performed by the processor, this approach leads to potential performance degradation due to the execution of more instructions and their associated dependencies (e.g., the explicit generation of the memory addresses and the address compare). Moreover, the reordered load operation cannot be performed until the memory addresses for both load and store operations have been resolved.

A method and apparatus for improving the performance of out-of-order operations is described by M. Kumar, M. Ebcioglu, and E. Kronstadt in their patent application entitled "A method and apparatus for improving performance of out-of-sequence load operations in a computer system", Ser. No. 08/320,111 filed Oct. 7, 1994, as a continuation of application Ser. No. 07/880,102 filed May 6, 1992, and assigned to the assignee of this application now U.S. Pat. No. 5,542,075. This method and apparatus uses compiler techniques, four new instructions, and an address compare unit. The compiler statically moves memory load operations ahead of memory store operations, marking all of them as out-of-order instructions. The addresses of operands loaded out-of-order are saved to an associative memory. On request, the address compare unit compares the addresses saved in the associative memory with the address generated by store operations. If a conflict is detected, recovery code is executed to correct the problem. The system clears addresses saved in the associative memory when there is no longer a need to compare those addresses. This approach only addresses the problem of reordering memory operations. It does not include the ability to speculatively execute memory load operations. Moreover, this approach requires special instructions to trigger the checking for conflicts in addresses, as well as to clear the address of an operand no longer needed, and imposes a burden on the compiler which has to detect and pair all potential conflicts. As a consequence, this approach cannot cope with conflicts that occur as a result of an unexpected combination of store/load instructions (perhaps produced by error), neither can it be used in a coherent multiprocessor context.

As a related subject, a hardware mechanism coupled with compiler support is described by G. Silberman and M. Ebcioglu in their patent application entitled "Handling of exceptions in speculative instructions", Ser. No. 08/377,563 filed on Jan. 24, 1995, and assigned to the assignee of this application. This mechanism reduces the overhead from exceptions originated by instructions executed speculatively. The mechanism relies on hardware resources such as an additional bit per register to indicate an exception generated during the speculative execution of an instruction, two additional register files to save the register operands so that speculative instructions invalidated by an exception can be re-executed, as well as information that allows tracing back to the source of the exception. This mechanism is applicable only to speculative instructions, not to reordered memory operations.

A method and apparatus for reordering load instructions is described in the patent application entitled "Memory processor that permits aggressive execution of load instructions" by F. Amerson, R. Gupta, V. Kathal and M. Schlansker (UK Patent Application GB 2265481A, No. 9302148.3, filed on Apr. 2, 1993). This patent application describes a memory processor for a computer system in which a compiler moves long-latency load instructions earlier in the instruction sequence, to reduce the loss of efficiency resulting from the latency of the load. The memory processor saves load instructions in a special register file for a period of time sufficient to determine if any subsequent store instruction that would have been executed prior to the load references the same address as that specified by the load instruction. If so, the memory processor reinserts the original load in the instruction stream so that it gets executed in-order. Thus, this system permits moving loads ahead of stores under compiler control, and relies on hardware to insert code to recover from a conflict. However, this system does not permit reordering other instructions that depend on the load (the hardware resources are able to reinsert only the load instruction), neither it allows for speculative execution of loads or other instructions. In other words, the method and apparatus is limited to hiding the latency of load instructions, whose maximum value must be known at compile time.

SUMMARY OF THE INVENTION

It is therefore an object of the present invention to provide a mechanism that allows moving load instructions earlier in the execution stream, allowing for arbitrary distance between reading from memory and using data loaded out-of-order.

It is another object of the present invention to provide a mechanism which is not limited to moving load operations out from loops and which can tolerate ambiguous memory references.

It is a further object of the invention to provide a mechanism that executes only one additional instruction for disambiguation purposes, thus producing better performance, and which integrates memory disambiguation with speculative execution.

It is yet another object of the invention to provide a mechanism wherein the overhead introduced is only one instruction and the load operation can be arbitrarily moved earlier in the instruction stream.

It is still another object of the invention to provide a mechanism which can cope with conflicts that occur as a result of an unexpected combination of store/load instructions and which can be used in a coherent multiprocessor context.

It is another object of the invention to provide a mechanism which combines speculative execution with reordering of memory operations in a way that requires rather simple implementations.

According to the invention, there is provided a method and apparatus for reordering memory operations in a superscalar or very long instruction word (VLIW) processor even for arbitrarily separated and ambiguous memory references. This reordering reduces the critical path length of programs by moving sequences of dependent operations earlier in the program execution, thereby increasing the performance of the computer system. The method and apparatus integrates reordering memory operations with speculative execution, and is applicable to uniprocessor and multiprocessor systems. The apparatus consists of a multiple-entry address comparator which checks for conflicts in addressing memory, a status bit per comparator entry to indicate conflicts generated by reordered memory operations, a status bit per register in the register file of the processor to indicate pending exceptions, special instructions to load a register out-of-order, copy a register loaded out-of-order, and commit a register loaded out-of-order, and compiler support to generate the code that uses these resources as well as code to recover from exceptions arising while executing an instruction out-of-order.

Out-of-order memory operations raise the following requirements:
- exceptions (side effects) generated by out-of-order load operations should not be reported (performed) until the data loaded is used for an in-order (non-speculative) operation;
- conflicts due to overlapping addresses when a load operation is moved above a store operation must be detected;
- data loaded ahead of a store must be checked for validity before being used in-order (in other words, a check that has not become stale due to an overlapping store); and
- volatile locations cannot be loaded speculatively.

The approach taken in this invention relies on the following:
- static reordering of code by the compiler to exploit instruction-level parallelism;
- hardware support to detect conflicts in ambiguous memory accesses, report delayed exceptions, and manipulate data loaded out-of-order; and
- compiler generation of code for manipulating the data loaded out-of-order and for the recovery from delayed exceptions.

BRIEF DESCRIPTION OF THE DRAWINGS

The foregoing and other objects, aspects and advantages of this invention will be better understood from the following detailed description of a preferred embodiment of the invention with reference to the drawings, in which:

FIG. 2 is a block diagram showing the hardware resources supporting the execution of out-of-order load operations illustrated by the flow diagram of FIG. 1.

DETAILED DESCRIPTION OF A PREFERRED EMBODIMENT OF THE INVENTION

Figure 1A:
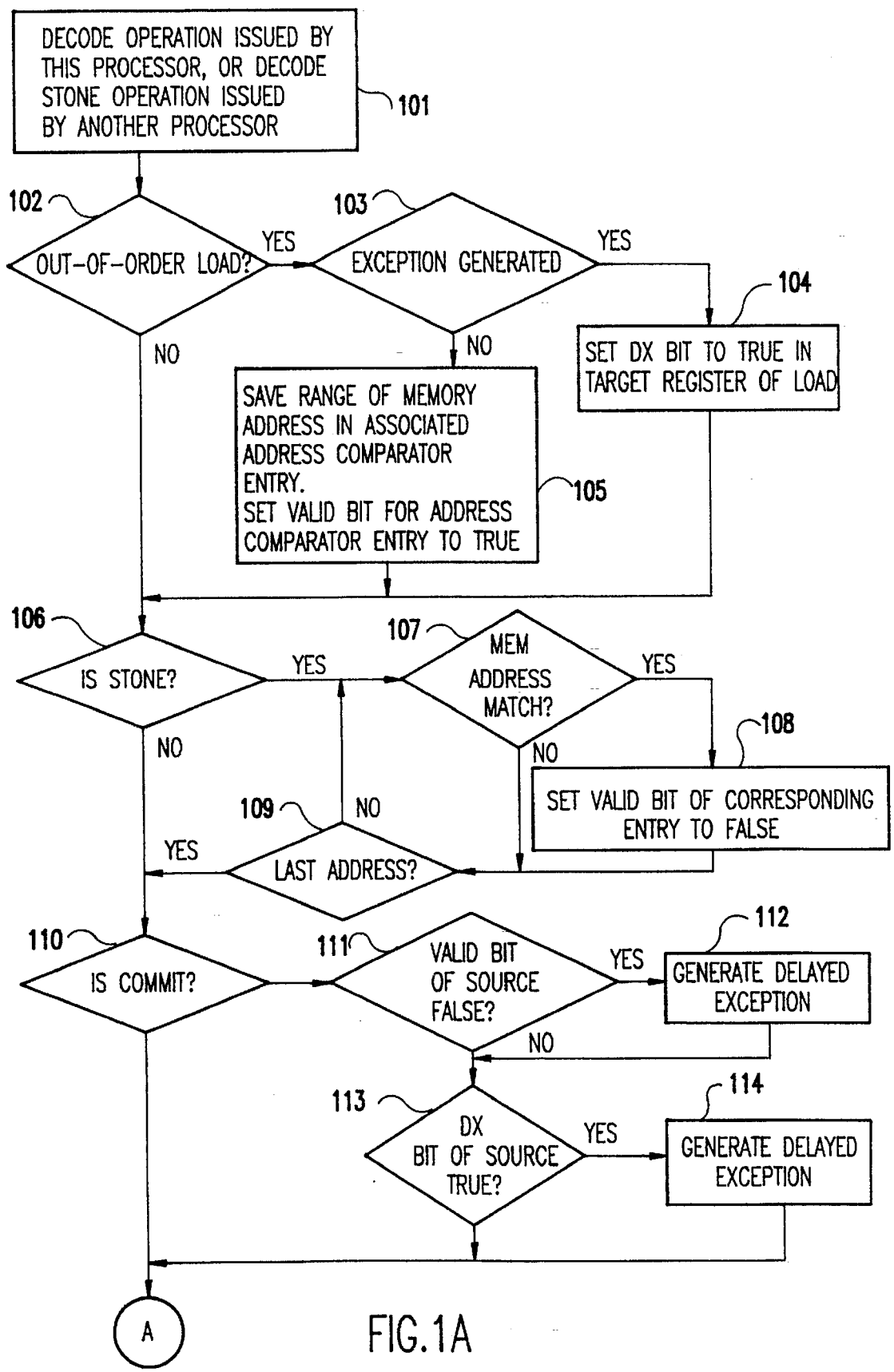
FIGS. 1A and 1B, taken together, are a flow diagram showing the logic for the execution of in-order and out-of-order operations performed by the present invention.
Figure 1B:
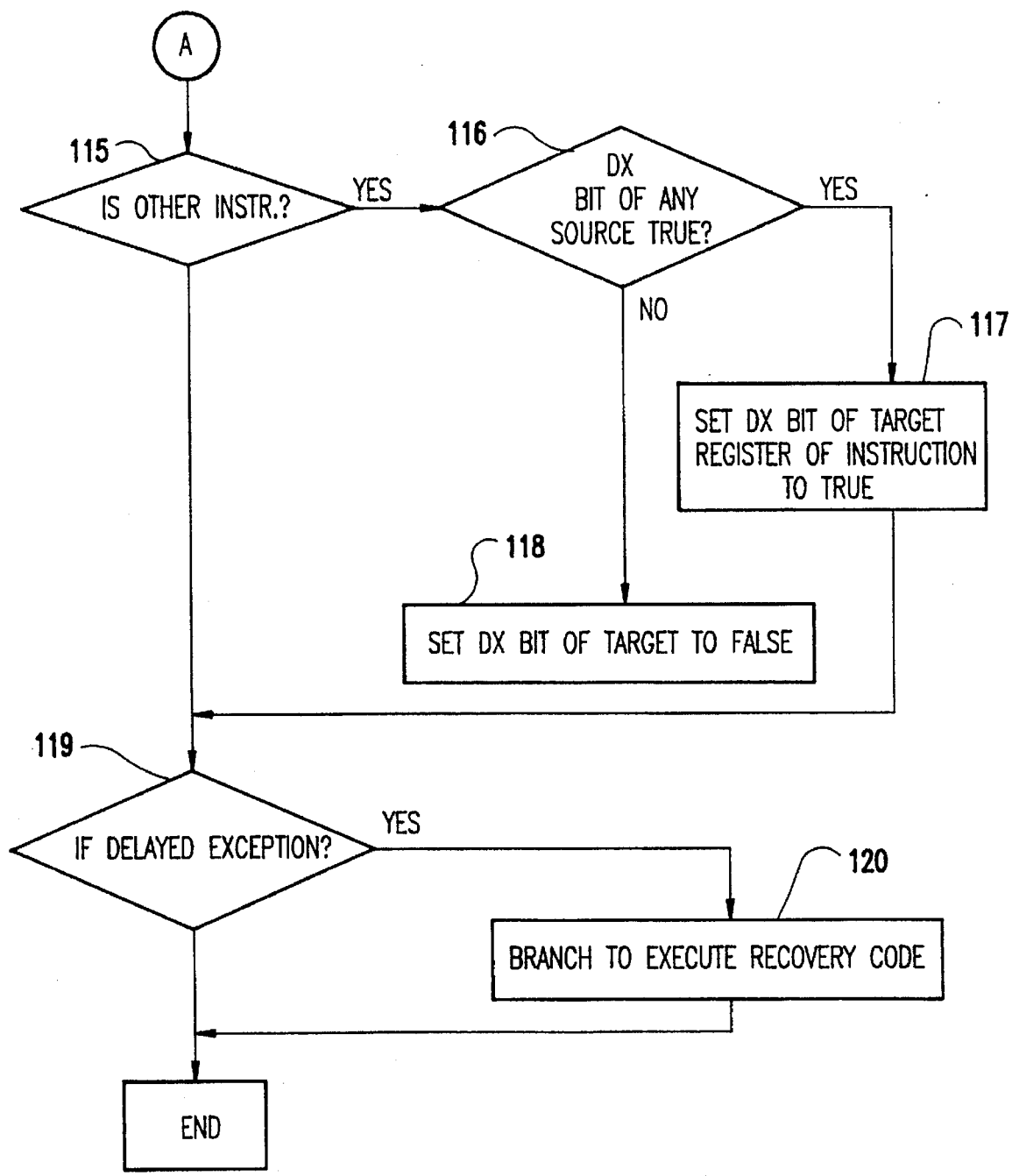

Referring now to the drawings, and more particularly to FIGS. 1A and 1B, there is shown a flow diagram of the out-of-order load and other operations performed by the present invention.

Every instruction issued by the processor, and every store operation issued by another processor in a coherent multiprocessor system, is decoded in function block 101. If the instruction is an out-of-order load operation as determined in decision block 102, and the instruction generates an exception as determined in decision block 103, then the delayed exception (DX) bit associated with the target register of the load instruction is set in function block 104, but no exception is raised to the processor. On the other hand, if the instruction does not generate an exception, then the range of memory addresses referenced by the instruction are saved in an entry in the address comparator (AC), and the valid bit of this entry is set to valid in function block 105 (i.e., the address comparator entries act as a cache of memory addresses recently loaded out-of-order).

If the instruction is a store operation as determined in decision block 106, the range of memory addresses referenced by the instruction is compared with all the entries in the address comparator in decision block 107. For each entry matching this range, the corresponding valid bit is set to invalid in function block 108. Decision block 109 checks if all addresses have been compared.

If the instruction is a commit operation as determined in decision block 110, the valid bit in the address comparator entry associated to the source register of the instruction is checked in decision block 111. If the bit is set to false, a delayed exception is generated in function block 112. At the same time, the delayed exception bit of the source register of the commit instruction is also checked in decision block 113. If this bit is set, a delayed exception is generated in function block 114.

If the operation is any other operation as determined in decision block 115, the delayed exception bit of all the source registers of the instruction is checked in decision block 116. If any of these bits is set, the delayed exception bit of the target register of the instruction is set in function block 117, but no exception is raised to the processor; otherwise, the delayed exception bit of the target register of the instruction is set to false in function block 118.

If a delayed exception is raised to the processor as determined in decision block 119, the excepting instruction is aborted and execution control is transferred to an exception handler in function block 120. This exception handler is in charge of executing "recovery code" which repeats the load operation which generated the exception, as well as any operation that depends on the load and which was executed before the exception was raised.

From the flow diagram shown in FIG. 1, the following features of this invention are inferred:

Reporting Exceptions: Errors (side effects) arising during the out-of-order execution of a load operation (such as protection violations) are not reported until the data loaded out-of-order is needed for an in-order operation, at the original place of the load instruction in a sequential instruction stream. If there were errors, the load instruction is re-executed at that point, as well as any other instruction(s) already executed that depend on the load which was executed out-of-order.

To execute out-of-order load instructions that might raise exceptions, target registers are tagged with a "Delayed Exception" bit. This bit is used to report, in delayed manner, the exceptions that occurred during execution of an out-of-order load instruction. The delayed exception bit is set when the out-of-order load generates an exception, and is propagated when a register is used in other operations. A commit operation checks the delayed exception bits of its operand. If the delayed exception bit is set, then a delayed exception is generated. The exception handler is in charge of re-executing the load instruction that raised the exception being reported in a delayed manner, as well as any other instruction(s) already executed that depended on it.

Conflicts Due to Overlapping Storage Addresses: Load operations moved ahead of store operations are subject to conflicts due to overlapping memory addresses. Conflicts may also arise due to store operations performed by other processors in a coherent multiprocessor environment. In both cases, an out-of-order load might access data that becomes stale as a consequence of a store operation to the same memory location (by the same or another processor) in the interval from the execution of the out-of-order load to the first in-order use of the data loaded.

Conflicts arising from overlapping load/store addresses are detected dynamically by using a multiple-entry "Address Comparator" (AC). When executing an out-of-order load operation, the range of real addresses of the operand loaded is saved in an address comparator entry.

When a store operation is executed, the range of real addresses of the store operand is compared against the contents of all entries in the address comparator. Similarly, in a coherent multiprocessor system, the address comparator entries are also checked when store references are received from other processors in the system. For each address comparator entry, if an overlap in the real address is detected, the entry is marked invalid.

Committing Data Loaded Out-of-Order: An operand loaded out-of-order, as well as any value derived from it, must be "committed" before it can be used as an operand in a non-speculative (in-order) instruction. That is, the program must verify that the address comparator entry associated with a particular register is still valid at the point where the data is used (usually, at the original place in the program). A special instruction is used for these purposes, which optionally copies the data loaded out-of-order into another register and at the same time verifies the validity of the associated address comparator entry. If the entry is valid, the commit (copy) operation proceeds. On the other hand, if the entry is invalid, a delayed exception is raised. The exception handler re-executes that load operation and any other operation(s) already executed that depend on the load.

Volatile Loads: Loads from volatile locations are not executed out-of-order. Any attempt to load out-of-order from a volatile location (detected by the storage protection mechanism) simply sets the delayed exception bit of the associated register. No storage access is performed.

Hardware Implementation

A processor provided with hardware resources to support out-of-order load and other operations as described above is shown in FIG. 2. The processor includes a plurality of functional units, such as fixed and floating point arithmetic logic units (ALUs). Six functional units 201 to 206 are shown, but those skilled in the art will understand that there may be more or fewer functional units, depending on a specific processor design. These functional units access data from a data cache 207, and in the case of a multiprocessor system, the data cache is connected to other processors. The functional units are connected to general purpose registers (GPRs) 208, floating point registers (FPRs) 209, and condition registers 210, as appropriate to the functional unit.

The structure described thus far is conventional and well understood in the art. The invention adds an address comparator (AC) buffers 211 and delayed exception (DX) bits 212, 213 and 214 respectively to GPRs 208, FPRs 209 and condition registers 210. More particularly, a delayed exception bit is associated with each register which can be the target of an operation executed out-of-order. Delayed exception bits are accessible as special purpose registers, and they are saved and restored as part of the state of the processor at context switching.

An address comparator 211 entry is associated with each register which is loaded out-of-order. FIG. 2 depicts a static association, in which each register has a unique (fixed) associated entry. (Alternatively, address comparator entries can also be assigned dynamically, at execution time, to each register that requires it.) In this embodiment of the invention, each AC entry consists of (1) the range of real addresses of the operand loaded out-of-order; (2) a valid bit indicating if any byte of the operand loaded out-of-order has been modified by a subsequent store operation, either from the same processor or from another processor in a coherent multiprocessor system; and (3) a comparator, which checks for a match among the range of addresses covered by the AC entry and the range of addresses of each store operation.

In the embodiment shown in FIG. 2, if an implementation contains fewer AC entries than the number of registers which can be loaded out-of-order, then registers without an AC entry have only the associated valid bit which is permanently set to invalid. In this way, any access to a nonexisting AC entry will report an invalid entry and generate a delayed exception.

Out-of-order instructions use the DX bit of the register operands as follows. If the instruction generates an exception, only the DX bit of the target register is set but the exception is not raised. If the DX bit of any operand used by the instruction is set (which indicates that a delayed exception was already generated), the DX bit of the target register is also set; that is, the delayed exception is propagated through the out-of-order operations.

In addition to the resources described above, the invention includes the following instructions which are executed by the processor:

Load Register Out-of-order - This instruction loads a memory location into a register and stores the range of real addresses of the operand in the corresponding AC entry, which is marked valid. In practice, load instructions are extended by adding one bit to indicate the in-order/out-of-order nature of the instruction.

Move Register Out-of-order - This instruction copies the contents of the source register and its associated AC entry into the target register and associated target AC entry. Due to its functionality, this is always an out-of-order instruction. The delayed exception (DX) bit of the source register is copied into the delayed exception bit of the target register, but no exceptions are raised.

Commit Register - This instruction is executed only in-order. It copies the contents of a register loaded out-of-order into another register, checks that the address comparator entry associated with the source register has not been invalidated by a store to an overlapping address, and checks that the delayed exception bit of the source register is not set. If the address comparator entry is valid and the delayed exception (DX) bit is not set, the move register operation proceeds. If the AC entry is not valid or the DX bit is set, a delayed exception is generated.

Invalidate Address Comparator Entries - This instruction invalidates the contents of the entire address comparator. It is used by the system software if the AC is not saved when context is switched, to avoid having an AC entry from the old context generate an exception in the new context.

Example of Speculation of Load Operations

The use of the resources described above is now illustrated by way of example. Consider the (original) code shown below in the left hand column which contains a load instruction and some arithmetic instructions that depend on the load below a store instruction. In this example, the first register after the name of the instruction is the target register, whereas the remaining registers are the operands.

| Original Code | | Load Moved Above Store | |
|---|---|---|---|
| ... | | load? | r25,10(r4) |
| store | r3,20(r2) | ... | |
| ... | | store | r3,20(r2) |
| load | r5,10(r4) | ... | |
| add | r6,r5,20 | commit | r5,r25 |
| sub | r7,r6,r7 | add | r6,r5,20 |
| ... | | sub | r7,r6,r7 |
| | | ... | |

The load instruction is moved above the store, as depicted in the right hand column. In this example, it is assumed that the target register is renamed. The new target register is loaded out-of-order, as indicated by the question mark in the load opcode in the right hand column. As a consequence, the data is loaded into the target register while the range of addresses of the loaded operand is saved in an AC entry, which is marked valid. The original load instruction is replaced by a commit instruction, as shown in the right hand column.

Assume that the arithmetic instructions that follow the load are also reordered as shown below:

| Previous Code | | Operations Moved Above Commit Instruction | |
|---|---|---|---|
| load? | r25,10(r4 | load? | r25,10(r4) |
| ... | | add? | r26,r25,20 |
| ... | | sub? | r27,r26,r7 |
| ... | | ... | |
| store | r3,20(r2) | store | r3,20(r2) |
| ... | | ... | |

| Previous Code | | Operations Moved Above Commit Instruction | |
|---|---|---|---|
| commit | r5,r25 | commit | r5,r25 |
| add | r6,r5,20 | copy | r6,r26 |
| sub | r7,r6,r7 | copy | r7,r27 |
| ... | | ... | |

Furthermore, assume that these instructions cannot raise exceptions. In this case, the commit operation is followed by copy register operations which copy the results from the out-of-order operations to their destination registers, if necessary. Such copy operations can be removed by copy-propagation steps during code optimization performed by the compiler. In contrast to the commit out-of-order register instruction, the copy register operations just copy the source register into the destination register, without checking the address comparator, because the corresponding operands are implicitly either validated or invalidated by the preceding commit operation.

If the store operation overlaps the location loaded out-of-order, then the corresponding AC entry is marked invalid as a side effect of the store operation. Consequently, the execution of the commit instruction raises a delayed exception. The handler associated with this exception must contain recovery code which executes the load operation as well as the two operations that depend on the load, which were executed before the exception was raised. For this purpose, the operands of the instructions that are re-executed in the recovery code must still be available either in the same registers or in other locations.

As an example, consider the recovery code below for the reordered code shown above:

| Reordered Code | | Recovery Code | | |
|---|---|---|---|---|
| load? | r25,10(r4) | | | |
| add? | r26,r25,20 | | | |
| sub? | r27,r26,r7 | | | |
| ... | | | | |
| store | r3,20(r2) | | | |
| ... | | rcvr: | load | r25,10(r4) |
| commit | r5,r25 | | add | r26,r25,20 |
| copy | r6,r26 | | sub | r27,r26,r7 |
| copy | r7,r27 | | return | |
| ... | | | | |

Note that every instruction which depends on the out-of-order load is re-executed as part of the recovery code, which then returns to re-execute the commit operation. Alternatively, as a further optimization, whenever possible the recovery code can directly update the original target registers and skip the copy register operations which were not removed by copy-propagation optimizations.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of reordering memory operations in superscalar or very long instruction word (VLIW) processors even for arbitrarily separated and ambiguous memory references comprising the steps of:

decoding instructions issued by a processor;

determining if a decoded instruction is an out-of-order load instruction and, if so, determining if the out-of-order load instruction generates an exception;

setting a delayed exception bit associated with a target register of the load instruction for an out-of-order load instruction which generates an exception;

saving a memory address of an out-of-order load instruction which does not generate an exception in an address comparator and setting a valid bit for the saved memory address in the address comparator;

determining if a decoded instruction is a store operation;

comparing a range of memory addresses referenced by a decoded store instruction with all entries in the address comparator;

for each match of an entry in the address comparator, setting the valid bit of the corresponding entry to invalid;

determining if a decoded instruction is a commit operation;

checking the valid bit of the address comparator entry associated with a target register of the decoded commit operation and generating a delayed exception if the valid bit is set to invalid and, at the same time, checking the delayed exception bit of a source register of the commit operation and, if the delayed exception bit is set, generating a delayed exception; and aborting an excepting instruction and transferring control to an exception handler.

2. The method of reordering memory operations in superscalar or very long instruction word (VLIW) processors recited in claim 1 further comprising the steps of:

determining if the decoded instruction is other than an out-of-order load, a store or a commit instruction; and checking the delayed exception bit for all source registers used by the instruction and if any delayed exception bits are set, setting corresponding delayed exception bits in target registers.

3. A superscalar or very long instruction word (VLIW) processor capable of reordering memory operations even for arbitrarily separated and ambiguous memory references comprising:

a decoder for decoding instructions issued by the processor;

a plurality of registers each having delayed exception bits accessible as special purpose registers;

functional means for determining if a decoded instruction is an out-of-order load instruction and, if so, determining if the out-of-order load instruction generates an exception, said functional means setting a delayed exception bit associated with a target register of the load instruction for an out-of-order load instruction which generates an exception;

an address comparator for saving a memory address of an out-of-order load instruction which does not generate an exception, said address comparator having a valid bit which is set for the saved memory address;

said functional means determining if a decoded instruction is a store operation;

said address comparator comparing a range of memory addresses referenced by a decoded store instruction with all entries in the address comparator and, for each match of an entry in the address comparator, setting the valid bit of the corresponding entry to invalid;

said functional means determining if a decoded instruction is a commit operation, checking the valid bit of the address comparator entry associated with a source register of the decoded commit operation and generating a delayed exception if the valid bit is set to invalid and, at the same time, checking the delayed exception bit of a source register of the commit operation and, if the delayed exception bit is set, generating a delayed exception and aborting the excepting instruction; and an exception handler executing recovery code when an excepting instruction is aborted.

* * * * *